United States Patent
Wang et al.

(10) Patent No.: US 7,408,309 B2
(45) Date of Patent: Aug. 5, 2008

(54) INPUT CURRENT LIMITING CIRCUIT AND DRIVING DEVICE USING THE SAME

(75) Inventors: Chia-Peng Wang, Tu-Cheng (TW); Yi-Cheng Liu, Tu-Cheng (TW); Chih-Chan Ger, Tu-Cheng (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 0 days.

(21) Appl. No.: 11/309,928

(22) Filed: Oct. 27, 2006

(65) Prior Publication Data
US 2008/0001552 A1    Jan. 3, 2008

(30) Foreign Application Priority Data
Jun. 30, 2006    (TW) .................................. 95123838

(51) Int. Cl.
H05B 37/02    (2006.01)
(52) U.S. Cl. ..................... 315/307; 315/224; 315/246
(58) Field of Classification Search ................. 315/291, 315/307–308, 209 R, 224–225, 246, 247
See application file for complete search history.

(56) References Cited
U.S. PATENT DOCUMENTS

| | | | | |
|---|---|---|---|---|
| 5,914,566 A | * | 6/1999 | Matsumoto et al. ............ 315/82 |
| 6,049,179 A | | 4/2000 | Kisaichi et al. ............. 315/307 |
| 6,275,397 B1 | * | 8/2001 | McClain ....................... 363/89 |
| 2002/0175636 A1 | * | 11/2002 | Kawasaka et al. ........... 315/224 |
| 2004/0113569 A1 | * | 6/2004 | Henry ......................... 315/307 |
| 2006/0087262 A1 | * | 4/2006 | Kim et al. ................... 315/312 |
| 2006/0175984 A1 | * | 8/2006 | Okamoto et al. ............ 315/307 |
| 2006/0197469 A1 | * | 9/2006 | Kim ............................. 315/291 |
| 2007/0029945 A1 | * | 2/2007 | Yu et al. ...................... 315/224 |

* cited by examiner

Primary Examiner—Thuy Vinh Tran
Assistant Examiner—Tung X Le
(74) Attorney, Agent, or Firm—Wei Te Chung

(57) ABSTRACT

A driving device for driving a light source module (12) includes an input current limiting circuit (10) and an inverter (11). The input current limiting circuit includes an input current sensing circuit (100) and a feedback compensation circuit (103), for limiting current of an input power signal of the driving device to a predetermined range. The input current sensing circuit is used for sensing a current signal of the input power signal of the driving device. The feedback compensation circuit is connected to the input current sensing circuit, for outputting a compensation signal according to the sensed current signal. The inverter is connected between the input current limiting circuit and the light source module, and includes a feedback circuit (112). The feedback circuit is connected to the feedback compensation circuit, for receiving the compensation signal and feeding back current flowing through the light source module.

20 Claims, 5 Drawing Sheets

INPUT CURRENT LIMITING CIRCUIT AND DRIVING DEVICE USING THE SAME

FIELD OF THE INVENTION

The invention relates to current limiting devices, and particularly to an input current limiting circuit and a driving device using the same.

DESCRIPTION OF RELATED ART

Discharge lamps such as cold cathode fluorescent lights (CCFLs) are often used as light sources for liquid crystal display (LCD) panels. Typically, an inverter outputs alternating current (AC) signals to drive the CCFLs. Normally, the CCFLs are driven by high voltages. Therefore, input current of the inverter is relatively large when the CCFLs are driven. For example, a predetermined acceptable range of the input current is from 4.0 A to 4.6 A, however, during normal operation as much as 5.0 A of input current may be drawn when the CCFLs are initially started, disqualifying that particular inverter. One way to avoid the larger input current being drawn during start up is to regulate the input current so that the most current that can be drawn during start up is changed from 5.0 A to 4.6 A. However, the input current during normal operation will be relatively low when the CCFLs are stable, diminishing brightness of the CCFLs.

SUMMARY OF THE INVENTION

An exemplary embodiment of the invention provides a driving device with an input current limiting circuit for driving a light source module. The driving device includes an input current limiting circuit and an inverter. The input current limiting circuit includes an input current sensing circuit and a feedback compensation circuit, for limiting current of an input power signal of the driving device to a predetermined range. The input current sensing circuit is used for sensing a current signal of the input power signal of the driving device. The feedback compensation circuit is connected to the input current sensing circuit, for outputting a compensation signal according to the sensed current signal. The inverter is connected between the input current limiting circuit and the light source module, and includes a feedback circuit. The feedback circuit is connected to the feedback compensation circuit, for receiving the compensation signal and feeding back current flowing through the light source module.

Another embodiment of the present invention provides an input current limiting circuit. The input current limiting circuit is connected to a feedback circuit of an electronic device, for limiting current output to the electronic device to a predetermined range, and includes an input current sensing circuit and a feedback compensation circuit. The input current sensing circuit is used for sensing a current signal output to the electronic device. The feedback compensation circuit is connected between the input current sensing circuit and the feedback circuit, for outputting a compensation signal according to the sensed current signal.

Other advantages and novel features will become more apparent from the following detailed description of preferred embodiments when taken in conjunction with the accompanying drawings, in which:

DETAILED DESCRIPTION OF THE INVENTION

Figure 1:
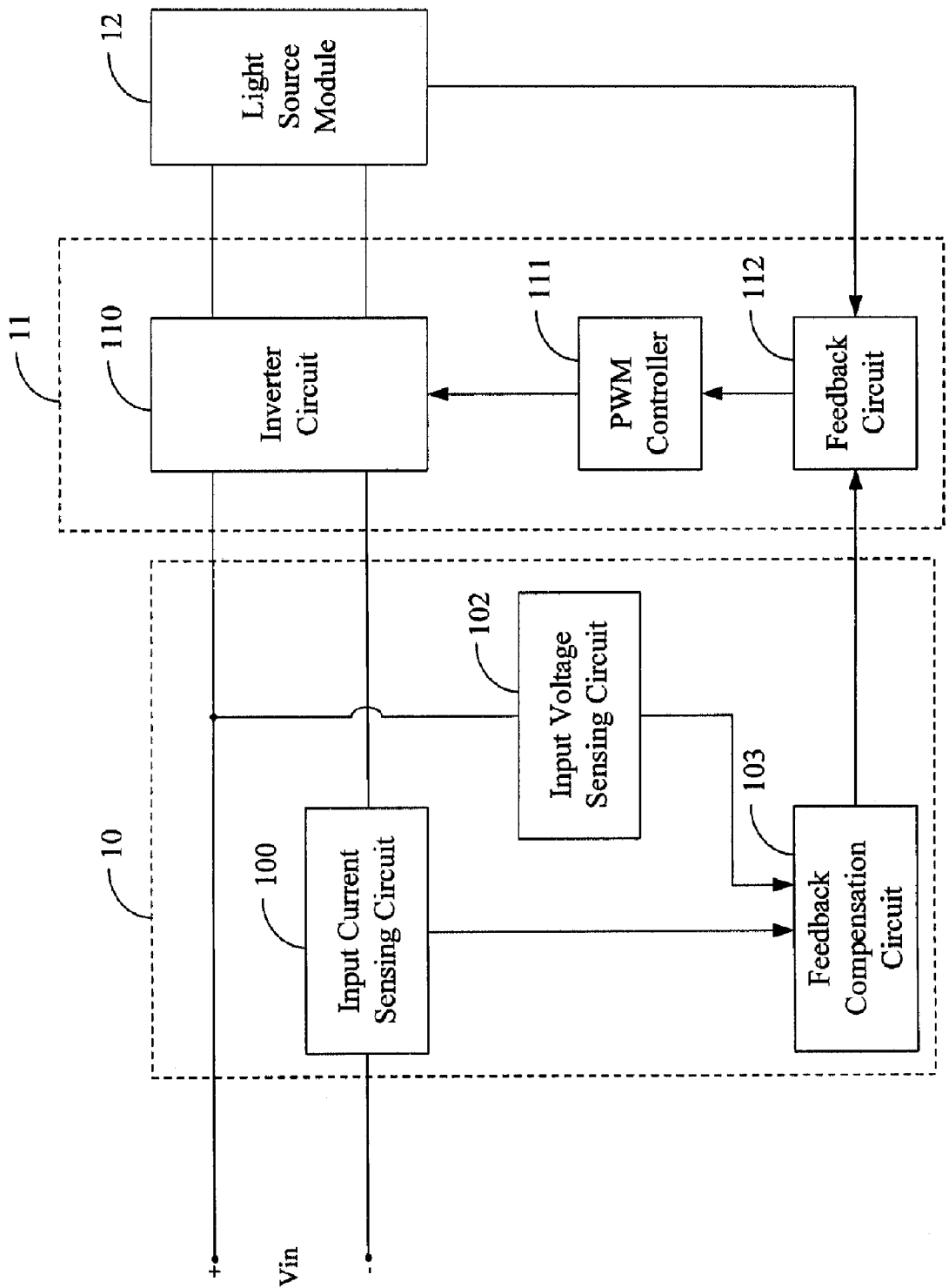
FIG. 1 is a driving device with an input current limiting circuit of an exemplary embodiment of the present invention.

FIG. 1 is a driving device with an input current limiting circuit of an exemplary embodiment of the present invention. The driving device for driving a light source module 12 includes an input current limiting circuit 10 and an electronic device 11. In the exemplary embodiment, an input Vin of the driving device has a positive end and a negative end.

The input current limiting circuit 10 is connected to the input Vin of the driving device, for limiting current of an input power signal of the driving device to a predetermined range. The input current limiting circuit 10 includes an input current sensing circuit 100, an input voltage sensing circuit 102, and a feedback compensation circuit 103. In the exemplary embodiment, the electronic device 11 is an inverter, which is connected between the input current limiting circuit 10 and the light source module 12, for driving the light source module 12. The inverter 11 includes an inverter circuit 110, a PWM controller 111, and a feedback circuit 112.

In the exemplary embodiment, the input current sensing circuit 100 is connected between the negative end of the input Vin of the driving device and the inverter circuit 110, for sensing a current signal of the input power signal.

Figure 2:
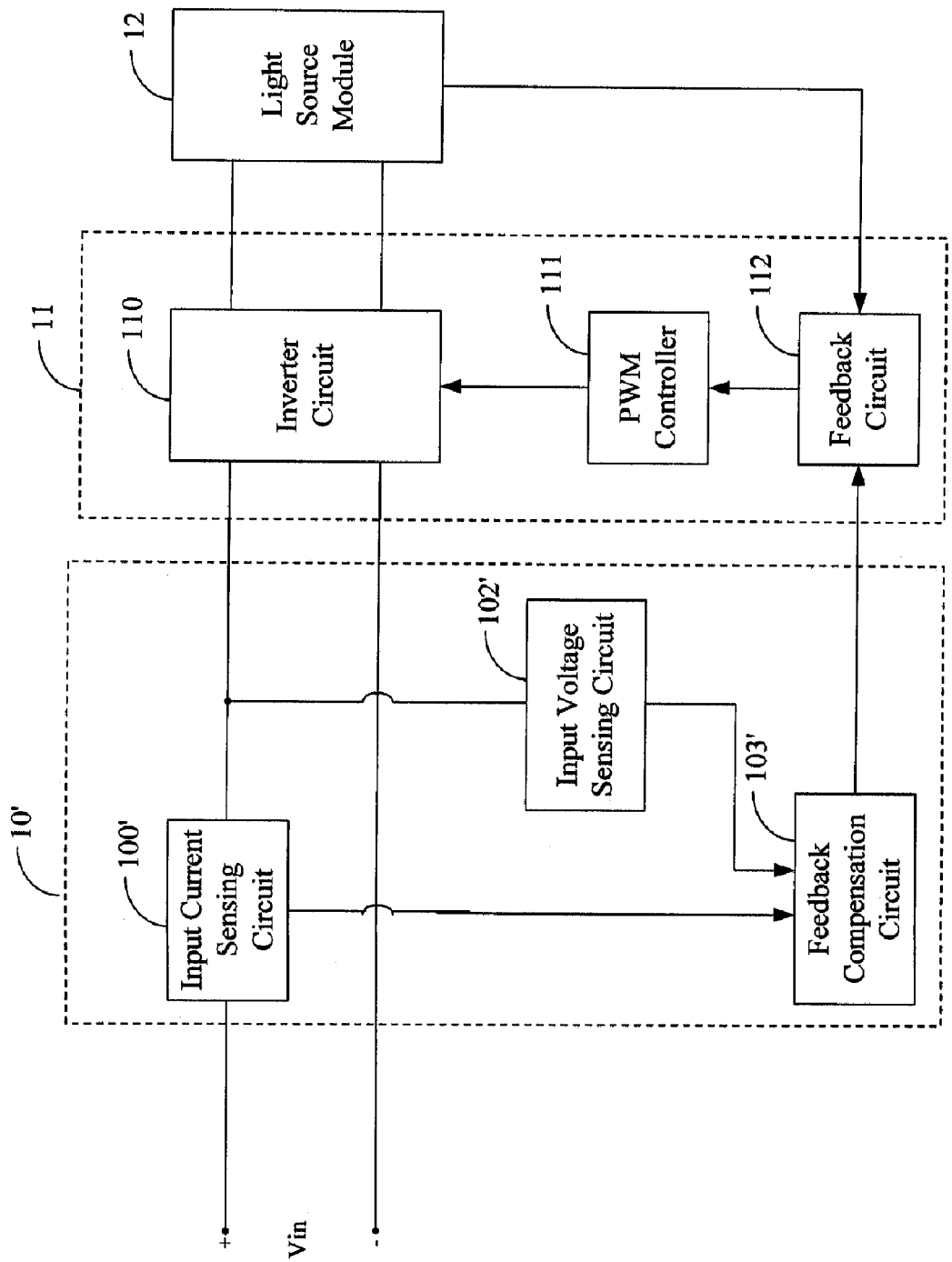
FIG. 2 is a driving device with an input current limiting circuit of another exemplary embodiment of the present invention.

In an alternative embodiment of the present invention, referring to FIG. 2, the input current sensing circuit 100' is connected between the positive end of the input Vin of the driving device and the inverter circuit 110, for sensing a current signal of the input power signal.

Referring to FIG. 1, the input voltage sensing circuit 102 is connected between the positive end of the input Vin of the driving device and the feedback compensation circuit 103, for sensing a voltage signal of the input power signal. The feedback compensation circuit 103 is connected between the input current sensing circuit 100 and the feedback circuit 112, for outputting a compensation signal according to the sensed current signal and the sensed voltage signal to the feedback circuit 112.

In the exemplary embodiment, the inverter circuit 110 is used for converting the input power signal received from the input Vin to an appropriate power signal to drive the light source module 12. The feedback circuit 112 is connected to the light source module 12, for feeding back current flowing through the light source module 12 to the PWM controller 111.

The PWM controller 111 is connected between the inverter circuit 110 and the feedback circuit 112, for controlling output of the inverter circuit 110 according to the feedback current signal and the compensation signal.

When the light source module 12 is driven but unstable, the feedback compensation circuit 103 outputs a compensation signal to the feedback circuit 112. Then the PWM controller 111 controls the output of the inverter circuit 110 according to the compensation signal and the feedback current signal. Therefore, the current of the input power signal can be limited to a predetermined range.

Figure 3:
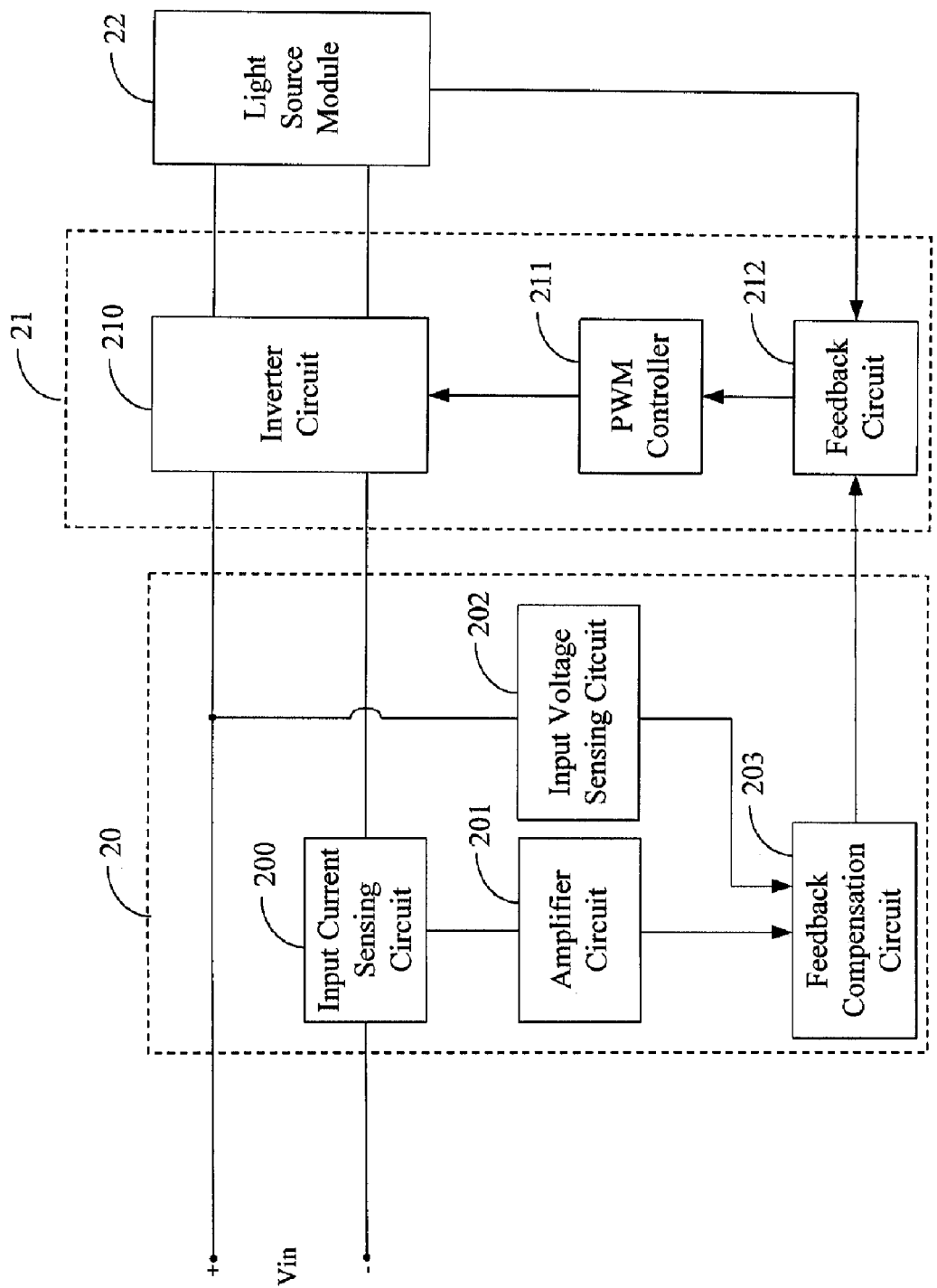
FIG. 3 is a driving device with an input current limiting circuit of another exemplary embodiment of the present invention.

However, sometimes the current signal sensed by the input current sensing circuit 100 may be too small. Thus, the present invention also provides another embodiment, referring to FIG. 3. The driving device of FIG. 3 is substantially the same as that of FIG. 1, except that the driving device of FIG. 3 includes an amplifier circuit 201. The amplifier circuit 201 is connected between the input current sensing circuit 200 and the feedback compensation circuit 203, for amplifying the sensed current signal.

Figure 4:
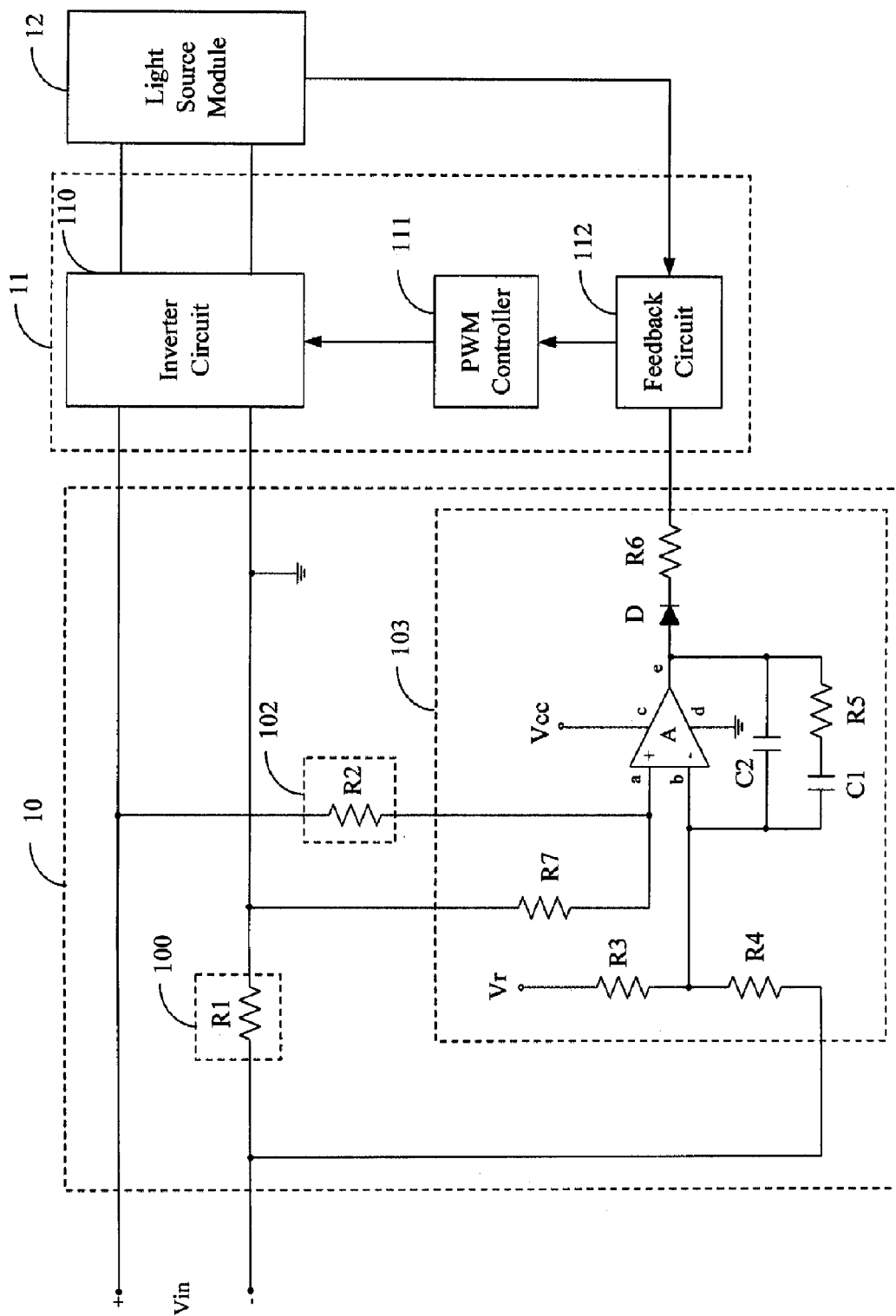
FIG. 4 is a detailed circuit diagram of FIG. 1 of the present invention.

FIG. 4 is a detailed circuit diagram of FIG. 1 of the present invention. The input current sensing circuit 100 includes a current sensing resistor R1. One end of the current sensing resistor R1 is connected to the negative end of the input Vin, and the other end of the current sensing resistor R1 is connected to the inverter circuit 110, for sensing a current signal of the input power signal. The input voltage sensing circuit 102 includes a voltage sensing resistor R2. One end of the voltage sensing resistor R2 is connected to the positive end of the input Vin, for sensing a voltage signal of the input power signal.

The feedback compensation circuit 103 includes a comparator A, a diode D and a plurality of voltage dividing resistors R3 and R4. The voltage dividing resistors R3 and R4 are connected in series, and arranged between a reference voltage Vr and the negative end of the input Vin, for dividing the reference voltage Vr. In the exemplary embodiment, the divided voltage on the voltage dividing resistor R4 is a reference voltage of the comparator A.

The comparator A has a first pin a, a second pin b, a third pin c, a fourth pin d and an output e. The first pin a of the comparator A is connected to the other end of the current sensing resistor R1. The second pin b of the comparator A is connected to a node between the voltage dividing resistors R3 and R4. The third pin c of the comparator A is connected to a power source Vcc. The fourth pin d of the comparator A is grounded. An anode of the diode D is connected to the output e of the comparator A, and a cathode of the diode D is connected to the feedback circuit 112.

When the current of the input power signal is less than the maximum value of the predetermined range, that is, the sensed current signal is less than the reference voltage of the comparator A, the output e of the comparator A outputs a logic low level, such as: 0. Thus, the diode D is off, and the feedback compensation circuit 103 has no output. Consequently, the PWM controller 111 controls the output of the inverter circuit 11 only according to the feedback current signal output from the feedback circuit 112.

When the current of the input power signal is greater than the maximum value of the predetermined range, that is, the sensed current signal is greater than the reference voltage of the comparator A, the output e of the comparator A outputs a logic high level, such as: 1. Thus, the diode D is on, and the feedback compensation circuit 103 outputs the compensation signal to the feedback circuit 112. Consequently, the PWM controller 111 controls the output of the inverter circuit 11 according to the feedback current signal and the compensation signal to limit the current signal of the input power signal.

After some time, when the light source module 12 becomes stable, the current of the input power signal will also be stable. Therefore, the current is controlled in the predetermined range, and the feedback compensation circuit 103 has no output. Obviously, in order to maintain the current of the input power signal in the predetermined range, the feedback compensation circuit 103 is operated before the light source module 12 becomes stable.

In the exemplary embodiment, the first pin a of the comparator A is connected to the other end of the voltage dividing resistor R2. The feedback compensation circuit 103 also includes a plurality of resistors R5, R6, and R7, and a plurality capacitors C1 and C2. The capacitor C1 is connected to the resistor R5 in series, and arranged between the second pin b and the output e of the comparator A. The capacitor C2 is also connected between the second pin b and the output e of the comparator A. The resistor R7 is connected between the other end of the current sensing resistor R1 and the first pin a, of the comparator A, for maintaining stable power with the voltage sensing resistor R2. The resistor R6 is connected between the cathode of the diode D and the feedback circuit 112, for controlling gain of the feedback compensation circuit 103. In alternative embodiments of the present invention, the anode of the diode D is connected to the output e of the comparator A via the resistor R6, and the cathode of the diode D is directly connected to the feedback circuit 112.

Figure 5:
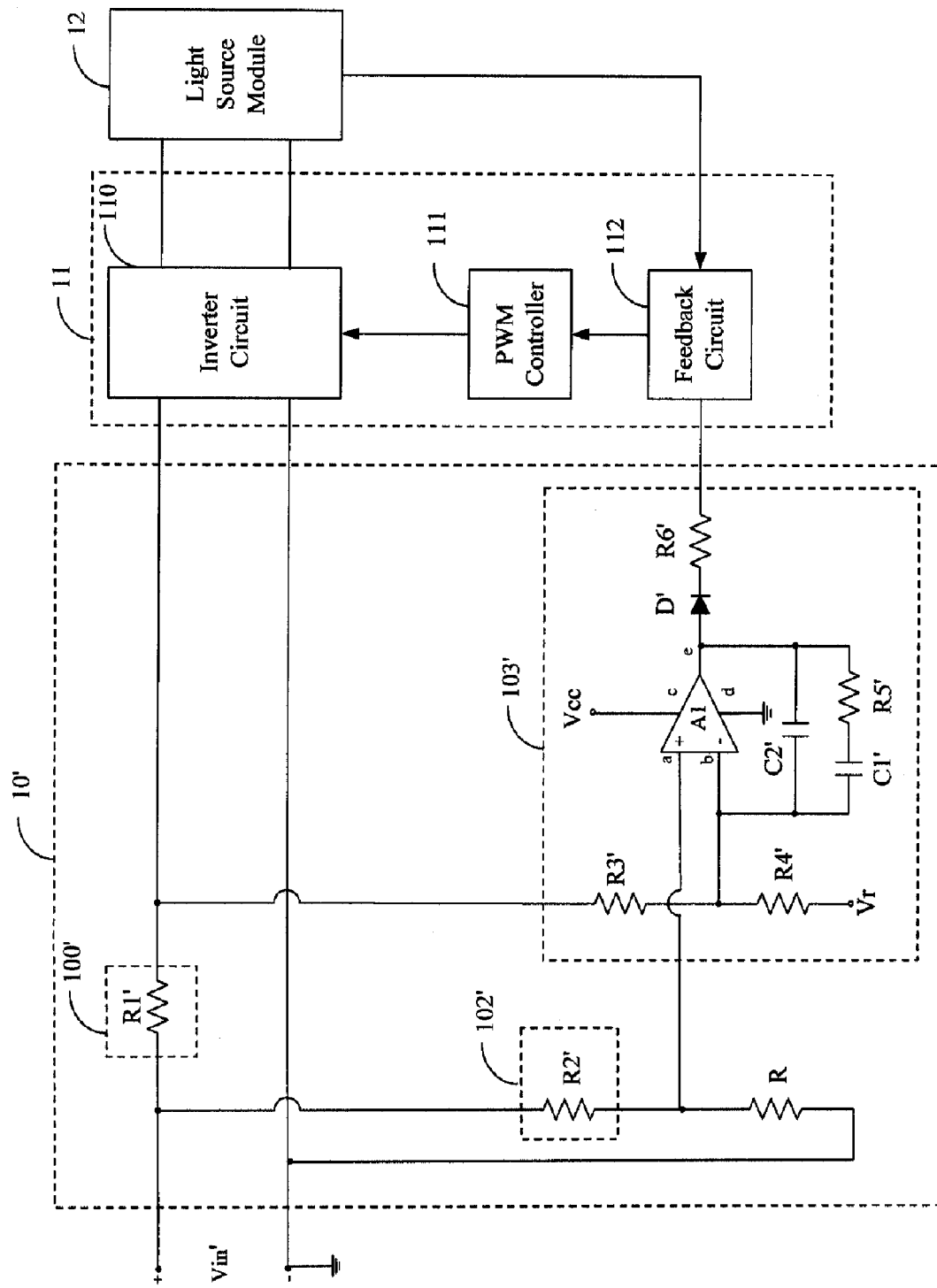
FIG. 5 is a detailed circuit diagram of FIG. 2 of the present invention.

FIG. 5 is a detailed circuit diagram of FIG. 2 of the present invention, which is the substantially the same as the FIG. 4, except that one end of the current sensing resistor R1' is connected to the positive end of the input Vin', and the other end of the current sensing resistor R1' is connected to the inverter circuit 110, for sensing the current signal of the input power signal. The voltage sensing resistor R2' is connected to a resistor R in series, and arranged between the positive end and the negative end of the input Vin, for sensing the voltage signal of the input power signal. The voltage dividing resistors R3' and R4' are in series connected between the other end of the current sensing resistor R1' and a reference voltage Vr, for providing a reference voltage of the comparator A1. The first pin a, of the comparator A1 is connected to a node between the voltage sensing resistor R2' and the resistor R. The second pin b of the comparator A1 is connected to a node between voltage dividing resistors R3' and R4'. Connections of other components of FIG. 5 are the same as those of FIG. 4, thus description is omitted.

In the present invention, the driving device uses a feedback compensation circuit that outputs a compensation signal to the feedback circuit. When the light source module is unstable, the current flowing through the light source module is controlled by the compensation signal and a feedback current signal. Thus, the current of the input power signal is changed with the current flowing through the light source module, which can be limited to a predetermined range.

While embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A driving device for driving a light source module, comprising:

an input current limiting circuit, for limiting current of an input power signal received from an input of the driving device to a predetermined range, comprising:
an input current sensing circuit, for sensing a current signal of the input power signal of the driving device; and
a feedback compensation circuit, connected to the input current sensing circuit, for outputting a compensation signal according to the sensed current signal when the light source module is initially started; and an inverter, connected between the input current limiting circuit and the light source module, and for converting the input power signal to an alternating current (AC) signal to drive the light source module, and comprising:

a feedback circuit connected to the feedback compensation circuit, for receiving the compensation signal and feeding back current flowing through the light source module.

2. The driving device as claimed in claim 1, wherein the inverter comprises:
an inverter circuit, connected to the light source module, for converting the input power signal of the driving device to the AC signal to drive the light source module; and
a PWM controller, connected between the feedback circuit and the inverter circuit, for controlling output of the inverter circuit according to the feedback signal and the compensation signal.

3. The driving device as claimed in claim 1, wherein the input current limiting circuit comprises an amplifier circuit, connected between the input current sensing circuit and the feedback compensation circuit, for amplifying the sensed current signal.

4. The driving device as claimed in claim 1, wherein the input current sensing circuit comprises a current sensing resistor, and one end of the current sensing resistor is connected to a negative end of an input of the driving device and the other end of the current sensing resistor is connected to the inverter circuit.

5. The driving device as claimed in claim 4, wherein the feedback compensation circuit comprises:
a first voltage dividing resistor;
a second voltage dividing resistor, connected to the first voltage dividing resistor in series and ranged between a reference voltage and the negative end of the input of the driving device in series;
a comparator which has a first pin, a second pin, a third pin, a fourth pin and an output; wherein the first pin of the comparator is connected to the other end of the current sensing resistor; the second pin of the comparator is connected to a node of the first voltage dividing resistor and the second voltage dividing resistor; the third pin of the comparator is connected to a power source; and the fourth pin of the comparator is grounded; and
a diode, wherein an anode of the diode is connected to the output of the comparator, and a cathode of the diode is connected to the feedback circuit.

6. The driving device as claimed in claim 5, wherein the feedback compensation circuit comprises:
a first resistor, connected between the other end of the current sensing resistor and the first pin of the comparator; and
a second resistor, connected between the cathode of the diode and the feedback circuit.

7. The driving device as claimed in claim 5, wherein the input current limiting circuit comprises an input voltage sensing circuit, connected between the input of the driving device and the feedback compensation circuit, for receiving the input power signal and sensing a voltage signal of the input power signal, and the input voltage sensing circuit comprises a voltage sensing resistor connected between a positive end of the input of the driving device and the first pin of the comparator.

8. The driving device as claimed in claim 1, wherein the input current sensing circuit comprises a current sensing resistor, and one end of the current sensing resistor is connected to a positive end of the input of the driving device and the other end of the current sensing resistor is connected to the inverter circuit.

9. The driving device as claimed in claim 8, wherein the feedback compensation circuit comprises:
a first voltage dividing resistor;
a second voltage dividing resistor, connected to the first voltage dividing resistor in series and arranged between the other end of the current sensing resistor and a reference voltage;
a comparator which has a first pin, a second pin, a third pin, a fourth pin and an output; wherein the first pin of the comparator is connected to said one end of the current sensing resistor; the second pin of the comparator is connected to a node of the first voltage dividing resistor and the second voltage dividing resistor; the third pin of the comparator is connected to a power source; and the fourth pin of the comparator is grounded; and
a diode, wherein an anode of the diode is connected to the output of the comparator, and a cathode of the diode is connected to the feedback circuit.

10. The driving device as claimed in claim 9, wherein the input current limiting circuit comprises an input voltage sensing circuit connected between the end of the current sensing resistor and the first pin of the comparator, and the input voltage sensing circuit comprises an input voltage sensing resistor.

11. An input current limiting circuit, connected to a feedback circuit of an electronic device, for limiting current output to the electronic device to a predetermined range, comprising:
an input current sensing circuit, for sensing the current signal output to the electronic device;
a feedback compensation circuit, connected between the input current sensing circuit and the feedback circuit, for outputting a compensation signal according to the sensed current signal; and
an amplifier circuit, connected between the input current sensing circuit and the feedback compensation circuit, for amplifying the sensed current signal.

12. The input current limiting circuit as claimed in claim 11, further comprising a current sensing resistor, wherein one end of the current sensing resistor is connected to a negative end of the input of the driving device and the other end of the current sensing resistor is connected to the inverter circuit.

13. The input current limiting circuit as claimed in claim 12, wherein the feedback compensation circuit comprises:
a first voltage dividing resistor;
a second voltage dividing resistor, connected to the first voltage dividing resistor in series and arranged between a reference voltage and the negative input of the driving device;
a comparator which has a first pin, a second pin, a third pin, a fourth pin and an output; wherein the first pin of the comparator is connected to the other end of the current sensing resistor; the second pin of the comparator is connected to a node of the first voltage dividing resistor and the second voltage dividing resistor; the third pin of the comparator is connected to a power source; and the fourth pin of the comparator is grounded; and
a diode, wherein an anode of the diode is connected to the output of the comparator, and a cathode of the diode is connected to the feedback circuit.

14. The input current limiting circuit as claimed in claim 13, wherein the feedback compensation circuit comprises:
a first resistor, connected between the other end of the current sensing resistor and the first pin of the comparator; and
a second resistor, connected between the cathode of the diode and the feedback circuit.

15. The input current limiting circuit as claimed in claim 13, further comprising an input voltage sensing circuit, connected between the input of the driving device and the feedback compensation circuit, for receiving the input power signal and sensing a voltage signal of the input power signal, and comprising a voltage sensing resistor connected between a positive input of the driving device and the first pin of the comparator.

16. The input current limiting circuit as claimed in claim 11, wherein the input current sensing circuit comprises a current sensing resistor, and one end of the current sensing resistor is connected to a positive end of the input of the driving device and the other end of the current sensing resistor is connected to the inverter circuit.

17. The input current limiting circuit as claimed in claim 16, wherein the feedback compensation circuit comprises:
    a first voltage dividing resistor;
    a second voltage dividing resistor, connected to the first voltage dividing resistor in series and arranged between the other end of the current sensing resistor and a reference voltage;
    a comparator which has a first pin, a second pin, a third pin, a fourth pin and an output; wherein the first pin of the comparator is connected to said one end of the current sensing resistor; the second pin of the comparator is connected to a node of the first voltage dividing resistor and the second voltage dividing resistor; the third pin of the comparator is connected to a power source; and the fourth pin of the comparator is grounded; and
    a diode, wherein an anode of the diode is connected to the output of the comparator, and a cathode of the diode is connected to the feedback circuit.

18. The input current limiting circuit as claimed in claim 17, further comprising an input voltage sensing circuit connected between the end of the current sensing resistor and the first pin of the comparator, and wherein the input voltage sensing circuit comprises an input voltage sensing resistor.

19. A device for driving a light source module, comprising:
    a power source for providing power signals to a light source module;
    an inverter circuit electrically connectable between said power source and said light source module for converting said power signals from said power source to alternating current (AC) signals in order to drive said light source module by means of said converted power signals;
    a feedback circuit electrically connectable with said light source module for retrieving information of electrical current flowing through said light source module;
    a controller electrically connectable between said inverter circuit and said feedback circuit for retrieving said information from said feedback circuit and controlling output of said converted power signals of said inverter circuit based on said information; and
    an input current limiting circuit electrically connectable between said power source and said feedback circuit for detecting said power signals from said power source and compensating electrical current of said detected power signals by means of said feedback circuit when said electrical current of said detected power signals is not within a predetermined range.

20. The device as claimed in claim 19, wherein said input current limiting circuit comprises an input current sensing circuit, an input voltage sensing circuit and a feedback compensation circuit, said feedback compensation circuit further comprises a comparator which has a first pin, a second pin, a third pin, a fourth pin and an output, wherein said first pin of said comparator is electrically connected to said input current sensing circuit and said input voltage sensing circuit, said second pin of said comparator is electrically connected to a reference voltage, said third pin of said comparator is electrically connected to a power source, and said fourth pin of said comparator is grounded.

* * * * *